(12) United States Patent
Sampath et al.

(10) Patent No.: US 10,989,411 B2
(45) Date of Patent: Apr. 27, 2021

(54) HEAT EXCHANGER FOR TURBO MACHINE

(71) Applicant: General Electric Company, Schenectady, NY (US)

(72) Inventors: Karthikeyan Sampath, Bangalore (IN); Varun Swaminathan Lakshmanan, Bangalore (IN); Michael Anthony Benjamin, Cincinnati, OH (US); Veeraraju Vanapalli, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 93 days.

(21) Appl. No.: 16/239,004

(22) Filed: Jan. 3, 2019

(65) Prior Publication Data

US 2020/0217510 A1 Jul. 9, 2020

(51) Int. Cl.

| | |
|---|---|
| *F23R 3/00* | (2006.01) |
| *F23R 3/28* | (2006.01) |
| *F28F 9/22* | (2006.01) |
| *F02K 3/06* | (2006.01) |

(52) U.S. Cl.
CPC .............. *F23R 3/283* (2013.01); *F02K 3/06* (2013.01); *F23R 3/286* (2013.01); *F28F 9/22* (2013.01); *F05D 2240/35* (2013.01); *F05D 2260/213* (2013.01)

(58) Field of Classification Search
CPC .... F23R 3/283; F23R 3/286; F05D 2260/213; F02C 7/18; F02C 7/185
See application file for complete search history.

(56) References Cited

U.S. PATENT DOCUMENTS

| | | | |
|---|---|---|---|
| 4,554,789 A | 11/1985 | Napoli et al. | |
| 5,685,158 A | 11/1997 | Lenahan et al. | |
| 6,267,553 B1 | 7/2001 | Burge | |
| 6,471,216 B1 | 10/2002 | Brainch et al. | |
| 6,672,072 B1 * | 1/2004 | Giffin, III | F01D 5/08 60/728 |
| 8,127,547 B2 | 3/2012 | Norris et al. | |
| 8,943,827 B2 | 2/2015 | Prociw et al. | |
| 9,476,313 B2 | 10/2016 | Caprario et al. | |

(Continued)

*Primary Examiner* — Katheryn A Malatek
(74) *Attorney, Agent, or Firm* — Edward A. Kmett; Michele V. Frank; Venable LLP (57) ABSTRACT

A turbo machine including a heat exchanger flowpath is generally provided. The turbo machine includes an outer casing extended along an axial direction, a prediffuser defining an inlet passage into a combustion section of the turbo machine, an inner casing extended from the prediffuser, in which a diffuser cavity is defined between the outer casing and the inner casing, a first plenum wall extended outward along a radial direction from the prediffuser, and a second plenum wall extended outward along a radial direction from the prediffuser. The second plenum wall is separated along the axial direction from the first plenum wall. A plenum is defined between the first plenum wall and the second plenum wall. The turbo machine includes a heat exchanger including a first conduit in fluid communication with the diffuser cavity. The first conduit is in fluid communication with a passage, and a second conduit in fluid communication with the passage and the plenum. A flow of working fluid is admitted from the diffuser cavity through the heat exchanger to the plenum via the first conduit, the passage, and the second conduit.

19 Claims, 8 Drawing Sheets

(56) References Cited

U.S. PATENT DOCUMENTS

| | | |
|---|---|---|
| 9,995,314 B2 | 6/2018 | Miller et al. |
| 2014/0178174 A1 | 6/2014 | Caprario et al. |
| 2014/0338334 A1 | 11/2014 | Karam et al. |
| 2015/0000291 A1 | 1/2015 | Smith et al. |
| 2017/0218845 A1 | 8/2017 | Snyder |
| 2017/0254269 A1 | 9/2017 | Snyder et al. |
| 2019/0113233 A1* | 4/2019 | Snyder .................... F02C 7/224 |

* cited by examiner

HEAT EXCHANGER FOR TURBO MACHINE

FIELD

The present subject matter relates generally to heat exchangers for turbo machines. The present subject matter relates specifically to heat exchanger systems at combustion sections.

BACKGROUND

As heat engines, such as gas turbine engines, increase in efficiency and overall pressure ratio (OPR), maximum air temperatures at the compressor exit into the combustion section are generally increasing as well. In some instances, the temperature of air within a cavity between the rotor assembly and an inner casing at the combustion section may be significantly higher than air at a diffuser cavity into which most compressor exit air enters. Seals at the combustion section and rotor assembly, such as compressor discharge pressure (CDP) seals generally sealing the compressor and turbine rotors from one another, may experience significant degradation and undesired changes in clearance due to these higher temperatures. These undesired changes in clearance may result in deterioration in heat engine operability, such as to cause stalls, surges, or other operability and performance malfunctions. As such, there is a need for a heat exchanger system that provides cooled air to the CDP seal.

BRIEF DESCRIPTION

Aspects and advantages of the invention will be set forth in part in the following description, or may be obvious from the description, or may be learned through practice of the invention.

A turbo machine including a heat exchanger flowpath is generally provided. The turbo machine includes an outer casing extended along an axial direction, a prediffuser defining an inlet passage into a combustion section of the turbo machine, an inner casing extended from the prediffuser, in which a diffuser cavity is defined between the outer casing and the inner casing, a first plenum wall extended outward along a radial direction from the prediffuser, and a second plenum wall extended outward along a radial direction from the prediffuser. The second plenum wall is separated along the axial direction from the first plenum wall. A plenum is defined between the first plenum wall and the second plenum wall. The turbo machine includes a heat exchanger including a first conduit in fluid communication with the diffuser cavity. The first conduit is in fluid communication with a passage, and a second conduit in fluid communication with the passage and the plenum. A flow of working fluid is admitted from the diffuser cavity through the heat exchanger to the plenum via the first conduit, the passage, and the second conduit.

In one embodiment, the first plenum wall and the second plenum wall are each extended along a circumferential direction to define the plenum annularly.

In various embodiments, the prediffuser comprises a vane through which a crossover passage is defined in fluid communication with the plenum and a cavity radially inward of the inner casing. In one embodiment, the turbo machine further includes a rotor assembly extended radially inward of the inner casing. The rotor assembly includes a seal defined at the rotor assembly and the inner casing. The cavity is defined between the rotor assembly and the inner casing in fluid communication with the plenum and the seal.

In still various embodiments, the turbo machine further includes a fuel injector assembly including a body defining an outer surface and an inner surface, in which the heat exchanger is disposed within the body. In one embodiment, the heat exchanger further includes a plurality of walls in concentric arrangement. The plurality of walls defines a plurality of passages including a first passage surrounded by a second passage. The plurality of walls defines a third passage surrounding the second passage. Each passage is fluidly segregated from one another by the plurality of walls. The first conduit is defined by a first conduit wall defined through the body from the outer surface. The first conduit wall fluidly segregates the first conduit from the third passage, and is further configured to admit the flow of working fluid from the diffuser cavity into the second passage. In another embodiment, the heat exchanger further includes a second conduit wall defined through the body from the outer surface. The second conduit wall defines the second conduit in fluid communication with the second passage, in which the second conduit wall fluidly segregates the first conduit from the third passage. The second conduit is configured to egress the flow of working fluid from the second passage to the plenum. In still another embodiment, the fuel injector includes a fin structure extended from one or more of the plurality of walls into the second passage. The fin structure defines a helical flowpath through the second passage.

In one embodiment, the turbo machine further includes a fuel system configured to provide one or more flows of de-oxygenated fuel to the first passage and the third passage of the fuel injector assembly. The second passage is configured to receive the flow of compressed air from the diffuser cavity via the first conduit. The fuel injector assembly is configured to egress the flow of compressed air via the second conduit. The one or more flows of fuel and the compressed air are in thermal communication within the heat exchanger.

In various embodiments, the second plenum wall includes an axially extended portion coupled to the heat exchanger, wherein the second plenum wall fluidly segregates the plenum from the diffuser cavity. In one embodiment, a flow passage of the plenum is defined between the outer casing and the axially extended portion of the second plenum wall. A second opening at the second conduit of the heat exchanger is defined in direct fluid communication with the flow passage.

In still various embodiments, the heat exchanger includes a heat exchanger body through which the first conduit, the passage, and the second conduit are defined. In one embodiment, the heat exchanger further defines an opening through which the fuel injector assembly is disposed. One or more flows of fuel are provided in thermal communication with the flow of working fluid through the heat exchanger. In another embodiment, the heat exchanger further defines a fluid inlet opening through the heat exchanger body. A flow of fluid is admitted through the heat exchanger in thermal communication with the working fluid.

In one embodiment, the heat exchanger is disposed at least partially through the outer casing, and wherein the second conduit is in fluid communication with the diffuser cavity.

In another embodiment, the turbo machine further includes a pressure plenum wall disposed forward of the first plenum wall along the axial direction. A pressure plenum is defined between the first plenum wall and the pressure plenum wall.

In various embodiments, the turbo machine further includes a third plenum wall extended from the prediffuser along the radial direction. The third plenum wall is spaced apart along the axial direction from a portion of the inner casing extended from the prediffuser. In one embodiment, a plenum opening is defined through the portion of the inner casing such as to provide fluid communication to a cavity between a rotor assembly and the inner casing.

In one embodiment, the heat exchanger including the first conduit, the passage, and the second conduit egressed to the plenum defined at least in part by the first plenum wall and the second plenum wall together define a heat exchanger flowpath.

In another embodiment, the turbo machine further includes a second heat exchanger disposed at least partially through the outer casing. The second heat exchanger is configured to receive the flow of working fluid from the second conduit of the heat exchanger, in which the second heat exchanger is in fluid communication with the plenum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a heat exchanger system that provides cooled air to the compressor discharge pressure (CDP) seal and other seal and rotor locations are provided. The system includes a first heat exchanger receiving compressed air from a compressor section (e.g., compressor discharge air, or Station 3.0 air, etc.). The compressed air is placed in thermal communication with a cooling fluid, such as one or more flows of fuel, before being discharged to an annular plenum or plurality of circumferentially segmented plenum defined between a pressure plenum wall and another upstream wall, each disposed between the combustion section and the compressor section. The plenum extends radially inward and through a compressor exit guide vane (CEGV) to route the cooled fluid to one or more seals and/or rotors, such as the CDP seal, or another seal between the rotor assembly and the combustion section, compressor section, or turbine section. Various embodiments define the first heat exchanger at the fuel nozzle, such as to enable thermal communication of the compressed air with one or more flows of a generally cooler fuel through the fuel nozzle. Other embodiments further define the first heat exchanger at a body or spacer at the fuel nozzle, such as to additionally, or alternatively, enable one or more flows of generally cooler bypass air therethrough in thermal communication with the compressed air. Still other embodiments further include a second heat exchanger through which the compressed air flows following the first heat exchanger, before the flow of fluid is routed through the plenum and to one or more seals and/or rotors.

The embodiments of the heat exchanger system provided herein may mitigate undesired changes in clearance between a static structure, such as the combustion section, or a static structure at the compressor section or turbine section, versus a rotor assembly or seal assembly. The improved clearances may further mitigate deterioration in heat engine operability, such as to prevent stalls, surges, or other operability and performance malfunctions at the engine, by reducing a thermal gradient across the static structure (e.g., the combustion section, the compressor section, the turbine section, etc.) via the cooled cooling fluid and plenum.

Figure 1:
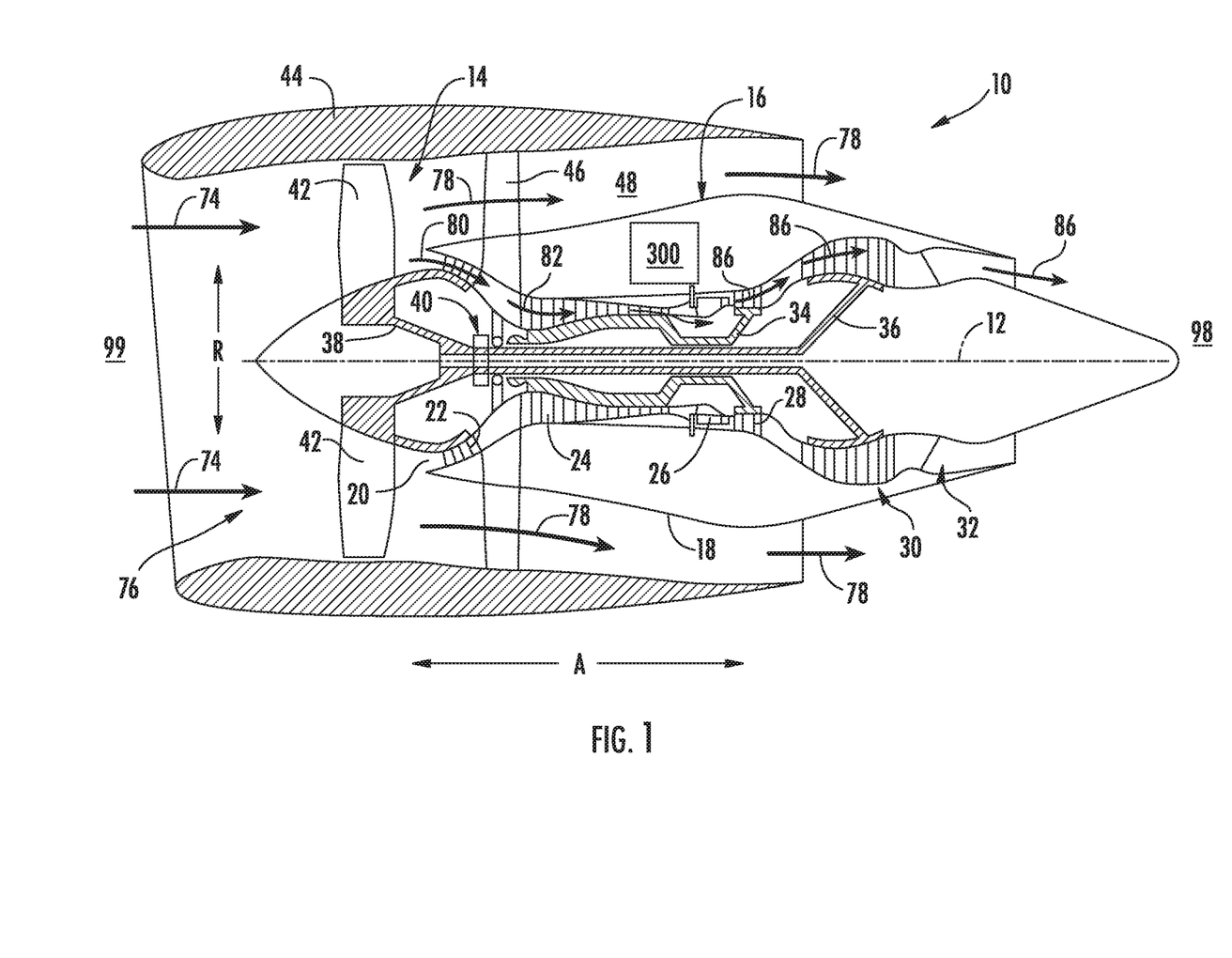
FIG. 1 is a schematic cross sectional view of an exemplary heat engine including a combustion section and fuel injector assembly according to aspects of the present disclosure.

Referring now to the drawings, FIG. 1 is a schematic partially cross-sectioned side view of an exemplary heat engine 10 herein referred to as "engine 10" as may incorporate various embodiments of the present disclosure. Although further described below with reference to a turbofan engine, the present disclosure is also applicable to heat engines, propulsion systems, and turbomachinery in general, including turbofan, turbojet, turboprop, turboshaft, and propfan gas turbine engines, marine and industrial turbine engines, and auxiliary power units. As shown in FIG. 1, the engine 10 has a longitudinal or axial centerline axis 12 that extends there through for reference purposes and generally along an axial direction A. A reference radial direction R is further provided extended from the axial centerline axis 12. The engine 10 further defines an upstream end 99 and a downstream 98 generally opposite of the upstream end 99 along the axial direction A. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

In various embodiments, a rotor assembly 90 (FIG. 2) is defined by one or more combinations of rotatable members of the compressors 22, 24 and the turbines 28, 30 coupled by the shafts 34, 36. For example, the rotor assembly 90 may include an HP spool including the HP compressor 24 coupled to the HP turbine 28 via the HP shaft 34. Additionally, or alternatively, axially extended hubs or other rotatable portions of the HP compressor 24 and the HP turbine 28 may be coupled to one another. In another embodiment, the rotor assembly 90 may include an LP spool including the LP compressor 22 coupled to the LP turbine 30 via the LP shaft 36. Additionally, or alternatively, the LP spool may include the fan section 14, such as the fan shaft 38 coupled to the LP shaft 36, either directly or indirectly via the reduction gear 40.

Figure 2:
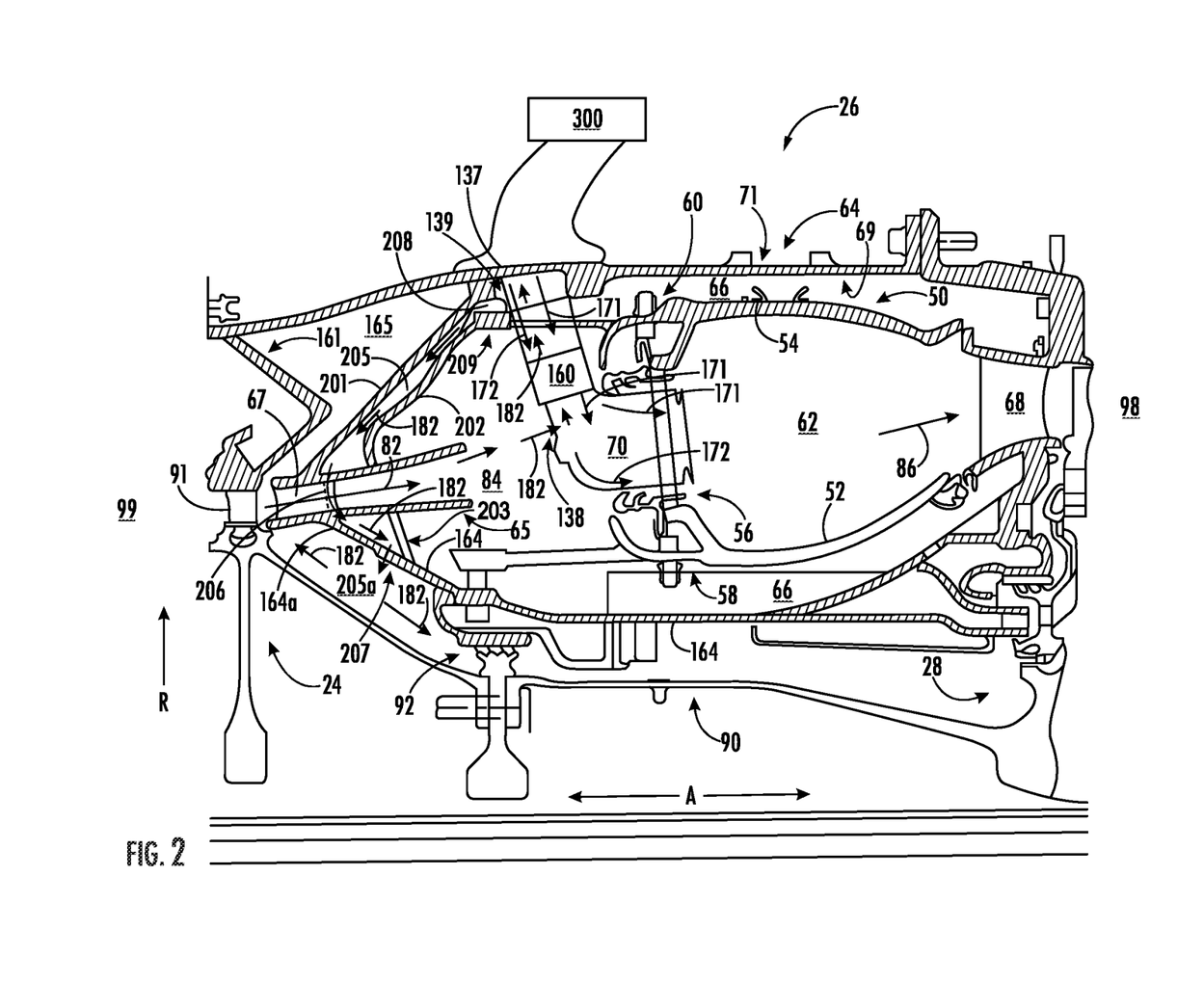
FIG. 2 is a cross sectional view of an exemplary combustion section and fuel injector assembly of the heat engine of FIG. 1 according to an aspect of the present disclosure.

FIG. 2 is a cross sectional side view of an exemplary combustion section 26 of the core engine 16 as shown in FIG. 1, including portions of the exit of the HP compressor 24 and the inlet of the HP turbine 28. As shown in FIG. 2, the combustion section 26 may generally include an annular type combustor 50 having an annular inner liner 52, an annular outer liner 54 and a dome wall 56 that extends radially between upstream ends 58, 60 of the inner liner 52 and the outer liner 54 respectfully. In other embodiments of the combustion section 26, the combustion assembly 50 may be a multi-annular combustor, such as a can or can-annular type. As shown in FIG. 2, the inner liner 52 is radially spaced from the outer liner 54 with respect to axial centerline 12 (FIG. 1) and defines a generally annular combustion chamber 62 therebetween. However, it should be appreciated that the liners 52, 54, swirlers, or other components may be disposed from the axial centerline 12 such as to define a multi-annular combustor configuration.

As shown in FIG. 2, the inner liner 52 and the outer liner 54 may be encased within an outer casing 64 extended along the axial direction A. the outer casing 64 defines an interior surface 69 and an exterior surface 71. An outer flow passage 66 may be defined around the inner liner 52, the outer liner 54, or both, between the outer casing 64 and an inner casing 164. The inner liner 52 and the outer liner 54 may extend from the dome wall 56 towards a turbine nozzle or inlet 68 to the HP turbine 28, thus at least partially defining a hot gas path between the combustor assembly 50 and the HP turbine 28.

The inner casing 164 is extended from a prediffuser 65 portion defining an inlet passage into the combustion section 26 through which a flow of compressed air 82 exit the compressors 22, 24 into the combustion section 26. The prediffuser 65 include a compressor exit guide vane (CEGV) 67 section conditioning the flow of compressed air 82 before entering a diffuser cavity 84 of the combustion section 26. The inner casing 164 is extended from the prediffuser 65 to the inlet 68 of the HP turbine 28. The outer casing 64 and the inner casing 164 are each extended substantially along the axial direction A, enclosing the combustor assembly 50 therewithin. The combustion section 26 includes a plenum 205 defined between at least a first plenum wall 201 and a second plenum wall 202 each extended generally along the radial direction R inward from the outer casing 64 to a prediffuser 65 and a compressor exit guide vane (CEGV) 67 portion of the combustion section 26. The plenum 205 is further defined in part between the outer casing 64 and an axially extended portion 209 of the second plenum wall 202, in which the axially extended portion 209 is coupled to a heat exchanger 160. The plenum 205 defines, at least in part, a heat exchanger flowpath through which a flow of cooling fluid is provided through the combustion section 26.

In various embodiments, a pressure plenum 165 may be defined between the first plenum wall 201 and a pressure plenum wall 161 disposed forward along the axial direction A (i.e., toward an upstream end 99 of the engine 10). The pressure plenum wall 161 is extended generally along the radial direction R such as to support a static structure surrounding one or more stators or shrouds circumferentially surrounding rotatable blades 91 of the compressor 24. It should be appreciated that in various embodiments, the pressure plenum 165 may define a bleed plenum through which a portion of the flow of compressed air 82 exiting the compressor 24 is bled or otherwise extracted for other uses.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across the CEGV 67 and through the prediffuser 65 into a diffuser cavity or head end portion 84 of the combustion section 26.

The prediffuser 65 and CEGV 67 condition the flow of compressed air 82 to the fuel injector assembly 70. The compressed air 82 pressurizes the diffuser cavity 84. The compressed air 82 enters the fuel injector assembly 70 to mix with a liquid and/or gaseous fuel.

The second plenum wall 202 is extended from the prediffuser 65 or CEGV 67 and generally outward along the radial direction R. The second plenum wall 202 is spaced apart or separated from the first plenum wall 201 along the axial direction A (e.g., the second plenum wall 202 is disposed downstream 98 of the first plenum wall 201) such as to define the plenum 205 between the first plenum wall 201 and the second plenum wall 202. In various embodiments, the plenum walls 201, 202 each extend annularly or along a circumferential direction relative to the axial centerline axis 12 (FIG. 1) such as to define the plenum 205 as annularly.

A third plenum wall 203 is extended from the prediffuser 65 or CEGV 67 and generally inward along the radial direction R. The third plenum wall 203 is spaced apart along the axial direction A from a portion 164(*a*) of the inner casing 164 extended from the prediffuser 65 or CEGV 67. A plenum opening 207 is defined through the portion 164(*a*) of the inner casing 164 such as to provide fluid communication to a cavity 205(*a*) between the rotor assembly 90 and the inner casing 164 along the radial direction R. The cavity 205(*a*) is in fluid communication with one or more stages of the rotatable blades 91 of the compressor 24. Additionally, or alternatively, the cavity 205(*a*) is in fluid communication with one or more seals 92, such as defined between the inner casing 164 and the rotor assembly 90 radially inward in the combustion section 26.

Referring still to FIG. 2, the plenum 205 may further include a crossover passage 206 defined through the CEGV 67 such as to provide fluid communication between the portion radially outward of the prediffuser 65 (i.e., the portion defined between the first and second plenum walls 201, 202) and the portion radially inward of the prediffuser 65 (i.e., the portion defined between the third plenum wall 203 and the inner casing 164). As such, the plenum 205 provides a conduit or passage fluidly segregated, or additionally, thermally segregated, from the diffuser cavity 84 and the flowpath from the compressor 24 into the combustion section 26. The plenum 205 provides a flow of cooled fluid (further described herein) therethrough to provide thermal attenuation to one or more of the rotatable blades 91 of the compressor, seals 92, and/or further downstream components at the turbine 28.

A fuel system 300 provides one or more flows of fuel 171, 172 to one or more fuel injector assemblies 70 coupled to an exterior surface 71 of the outer casing 64 and extended therethrough. The fuel system 300 may generally define a de-oxygenating fuel system providing flows of substantially or completely de-oxygenated fuel 171, 172 to each fuel injector assembly 70. The fuel may include liquid and/or gaseous flows of fuel. The de-oxygenated fuel mitigates risks associated with fuel coking. For example, the de-oxygenated fuel mitigates fuel coking in the heat exchanger 160 generally, or the fuel injector assembly 70 specifically, due to heat transfer from the working fluid 182 (e.g., compressor discharge air) to one or more flows of fuel 171, 172. In various embodiments, the flows of fuel 171, 172 are independently metered or controlled such as to provide flow rates, pressures, temperatures, or fuel types different from one another, or different to one or more of the fuel injector assemblies 70.

The fuel injector assembly 70 may extend at least partially through the dome wall 56 and provide a fuel-air mixture to the combustion chamber 62. The fuel injector assembly 70 includes a body 110 extended from the outer casing 64 and radially inward into the combustion section 26. The fuel injector assembly 70 may further include a head 113 that extends at least partially through the dome wall 56 to the combustion chamber 62.

A first end 101 of the fuel injector assembly 70 is defined at or proximate to a flange 150 of the fuel injector assembly 70 that couples to the outer casing 64. The flange 150 is generally extended from an outer wall 125 of a portion of the body 110 of the fuel injector assembly 70. The fuel injector assembly 70 further defines a second end 102 distal to the first end 101 along a body 110 or head 113 of the fuel injector assembly 70. The second end 102 may generally correspond to a portion of the fuel injector assembly 70 further downstream from the outer casing 64 relative to flows of fuel 171, 172 provided therethrough to the fuel injector assembly 70. For example, the second end 102 may correspond to a radially inward portion of the body 110 from which the head 113 is extended toward the combustion chamber 62. As another example, the second end 102 may correspond to one or more fuel outlets 114 of the fuel injector assembly 70 through which flows of fuel 171, 172 are provided to the combustion chamber 62.

Referring still to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

In various embodiments, the engine 10 includes a heat exchanger 160 defined at the combustion section 26. A portion of compressed air 82 provides a flow of working fluid, depicted schematically via arrows 182, to the heat exchanger 160. The working fluid 182, defining a portion of the compressed air 82 exiting the compressors 22, 24 into the combustion section 26, may be approximately 480 degrees Celsius or greater as it enters the heat exchanger 160. However, it should be appreciated that the working fluid 182 may define greater or lesser temperatures based at least on the compressors 22, 24 and an operating condition of the engine 10 (e.g., part load or full load condition, rotor speed, ambient air pressure or temperature, etc.). Generally, the working fluid 182 may define a temperature greater than the flows of fuel 171, 172 entering the fuel injector assembly 70.

Figure 3:
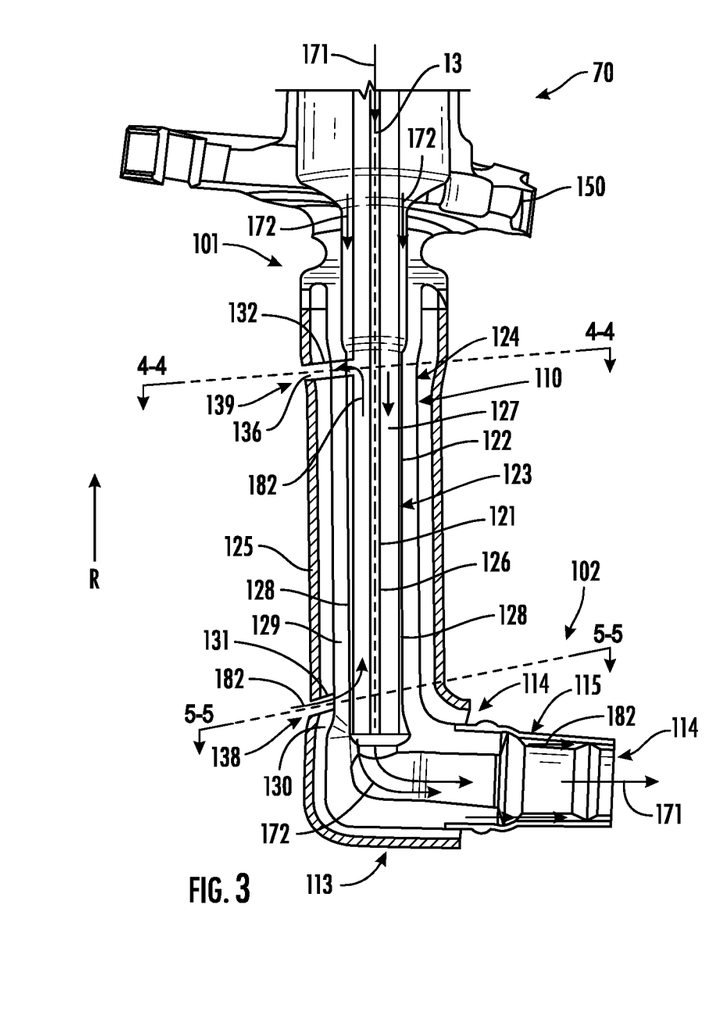
FIG. 3 is a cutaway cross sectional view of an exemplary embodiment of the fuel injector assembly of the combustion section of FIG. 2.
Figure 4:
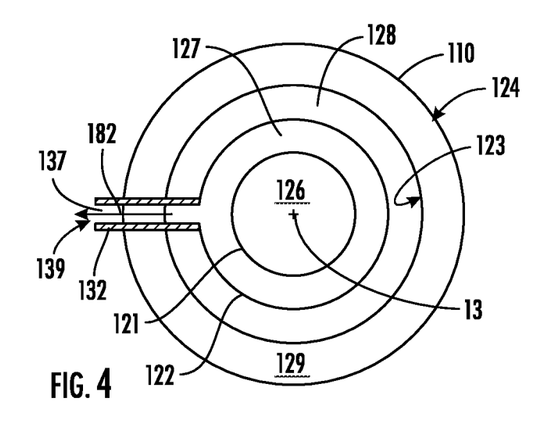
FIG. 4 is an exemplary cross sectional view of the fuel injector assembly of FIG. 3 at plane 4-4; 3
Figure 5:
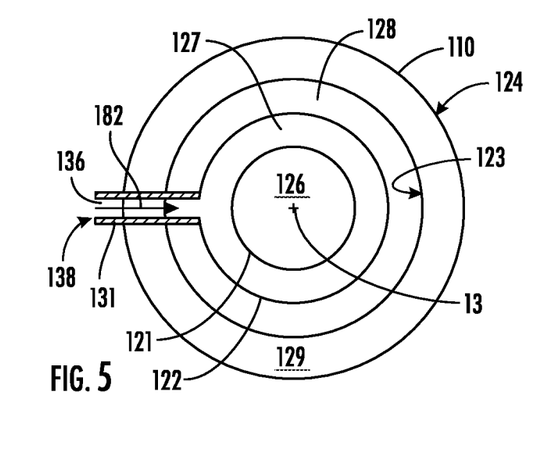
FIG. 5 is an exemplary cross sectional view of the fuel injector assembly of FIG. 3 at plane 5-5.

In various embodiments, the heat exchanger 160 is defined within the body 110 of the fuel injector assembly 70, such as shown and described in regard to FIGS. 3-5. In one embodiment, the heat exchanger 160 is defined between the first end 101 and the second end 102 of the fuel injector assembly 70, such as described in regard to FIGS. 3-5. FIG. 3 provides a cutaway view of an exemplary embodiment of the fuel injector assembly 70. Referring additionally to FIG. 4, a cross sectional view at plane 4-4 in FIG. 3 of the fuel injector assembly 70 is further provided. Referring to FIGS. 3-4, the body 110 of the fuel injector assembly 70 defines an outer enclosure 124. In various embodiments, the outer enclosure 124 of the body 110 is defined inward of an outer wall 125 defining a heat shield. An inner wall 123 is extended through the body 110 substantially co-directional to the outer enclosure 124. A first reference centerline axis 13 is defined through the fuel injector assembly 70. The first reference centerline axis 13 generally corresponds to the radial direction R of the engine 10. A plurality of walls 120 is extended through the body 110. In various embodiments, the plurality of walls 120 are each in generally concentric arrangement relative to the first reference centerline axis 13. The plurality of walls 120 defines a plurality of fluidly separated passages between the walls 120 and the outer wall 125.

The plurality of walls 120 includes a first wall 121 extended inward of and spaced apart from the inner wall 123 of the body 110 relative to the first centerline axis 13. A first passage 126 is defined within the first wall 121. A second wall 122 is extended inward of the inner wall 123 of the body 110 and outward of the first wall 121 relative to the first centerline axis 13. The second wall 122 is spaced apart from the inner wall 123 of the body 110 and the first wall 121. A second passage 127 is defined between the first wall 121 and the second wall 122. A third passage 128 is defined between the second wall 122 and the inner wall 123 of the body 110. Each passage 126, 127, 128 is fluidly segregated from one another via each of the plurality of walls 120 therebetween (e.g., the first wall 121 and the second wall 122). The fuel injector assembly 70 further includes a first conduit wall 131 defined through the body 110 from the outer wall 125, the outer enclosure 124, or both, and coupled to the second wall 122. The first conduit wall 131 defines a first conduit 136 therewithin in fluid communication with the second passage 127.

In various embodiments, a fourth passage 129 is defined between the inner wall 123 and the outer enclosure 124. The fourth passage 129 generally defines a volume at which a gas, such as air, or oxidizer generally, or an inert gas, surrounds the passages 126, 127, 128 within the body 110. In still another embodiment, a fifth passage 130 is defined between the outer enclosure 124 and the outer wall 125, such as to define another volume at which a gas, such as air or an oxidizer generally, surrounds the passages 126, 127, 128 within the body 110 and the fourth passage 129 surrounding the body 100.

During operation of the engine 10, a first flow of fuel, depicted schematically via arrows 171, is provided to the first passage 126 of the fuel injector assembly 70. A second flow of fuel, depicted schematically via arrows 172, is provided to the third passage 128 of the fuel injector assembly 70. The first flow of fuel 171 and the second flow of fuel 172 may each define one or more of a different pressure, flow rate, temperature, or fuel type (e.g., a liquid or gaseous fuel, or combinations thereof). It should be appreciated that the first passage 126 and the third passage 128 may each define different geometries (e.g., different cross sectional areas or volumes) such as to enable different pressures, flow rates, temperatures, etc. of the first flow of fuel 171 relative to the second flow of fuel 172.

A flow of a working fluid, depicted schematically via arrows 182, is provided to the second passage 127 via the first conduit 136 extended from a first opening 138 through the outer wall 125 of the body 110. In various embodiments, the working fluid is a portion of the compressed air 82 from the compressors 22, 24 (FIG. 1). The working fluid 182 provided to the second passage 127 is in thermal communication between first passage 126 and the third passage 128 such as to define the plurality of passages 126, 127, 128 within the body 110 as the heat exchanger 160.

Referring to FIG. 3, in one embodiment, the first conduit wall 131 defining the first conduit 136 in fluid communication with the second passage 127 is defined at the second end 102 distal to a second conduit wall 132 defining a second conduit 137 at the first end 101. Various embodiments of the second conduit wall 132 are configured similarly as described in regard to the first conduit wall 131. For example, the second conduit wall 132 defines the second conduit 137 in fluid communication with the second passage 127. The working fluid 182 enters the second passage 127 through the first conduit 136 and egresses from the fuel injector assembly 70 through the second conduit 137, thereby providing a substantially counter-directional flow to the first flow of fuel 171 and second flow of fuel 172 through the first passage 126 and third passage 128, respectively.

The first conduit wall 131 and the second conduit wall 132 each provide fluid communication between an exterior or outside of the fuel injector assembly 70 to the second passage 127 via the respective first conduit 136 and second conduit 137. Furthermore, the first conduit wall 131 and the second conduit wall 132 each fluidly segregate the working fluid 182 from the third passage 128 disposed between the exterior of the fuel injector assembly 70 and the second passage 127. The thermally communicated flows of fuel 171, 172 and working fluid 182 via the heat exchanger 160 defined within the fuel injector assembly 70 provide a cooled fluid to the plenum 205 of the combustion section 26 as the working fluid 182 exits the fuel injector assembly 70 via the second conduit 137.

The flows of fuel 171, 172 each egress from the fuel injector assembly 70 through one or more fuel outlets 114 at the head 113 of the fuel injector assembly 70. The thermal communication between the working fluid 182 and the flows of fuel 171, 172 provide for heat transfer from the working fluid 182 to one or more of the flows of fuel 171, 172. It should further be appreciated that fuel-air mixing may be improved via the transfer of thermal energy from the working fluid 182 to one or more of the flows of fuel 171, 172 within the fuel injector assembly 70. Such increase in thermal energy at the flows of fuel 171, 172 may improve atomization of the fuel 171, 172 as it egresses from the one or more fuel outlets 114 for ignition at the combustion chamber 62. Improved atomization may further improve emissions output or desirably alter heat release characteristics during combustion.

Referring back to FIG. 3, the fuel injector assembly 70 particularly defines the second conduit wall 132 and the second conduit 137 radially outward of an axially extended interior surface 209 of the second plenum wall 202 at least partially defining the plenum 205, such as shown schematically by reference plane 209 in FIG. 3 and further depicted in FIG. 2. In various embodiments, the fuel injector assembly 70 defines a portion of a heat exchanger flowpath of the engine 10 in which the working fluid 182 is provided from the diffuser cavity 84 through the fuel injector assembly 70 to the plenum 205. The working fluid 182 enters the fuel injector assembly 70 through the first opening 138 to the first conduit 136, flows through the second passage 127 in thermal communication with the fuels 171, 172 within the first passage 126 and third passage 128, respectively, and egresses from the fuel injector assembly 70 via a second opening 139 at the outer wall 125 of the body 110 at the second conduit 137.

Referring to FIGS. 2-3, in various embodiments, the second conduit 137 and second opening 139 is disposed radially outward of the axially extended interior surface 209 of the second plenum wall 202 and radially inward of the exterior surface 71 (FIG. 2) of the outer casing 64 to provide the second conduit 137 and the second opening 139 in fluid communication with the plenum 205. The second conduit 137 and the second opening 139 are disposed in direct fluid communication with a flow passage 208 defined between the axially extended interior surface 209 and the outer casing 64. The flow passage 208 is further a portion of the plenum 205 defining a flowpath from the heat exchanger 160 to the cavity 205(a) radially inward of the inner casing 164.

Figure 6:
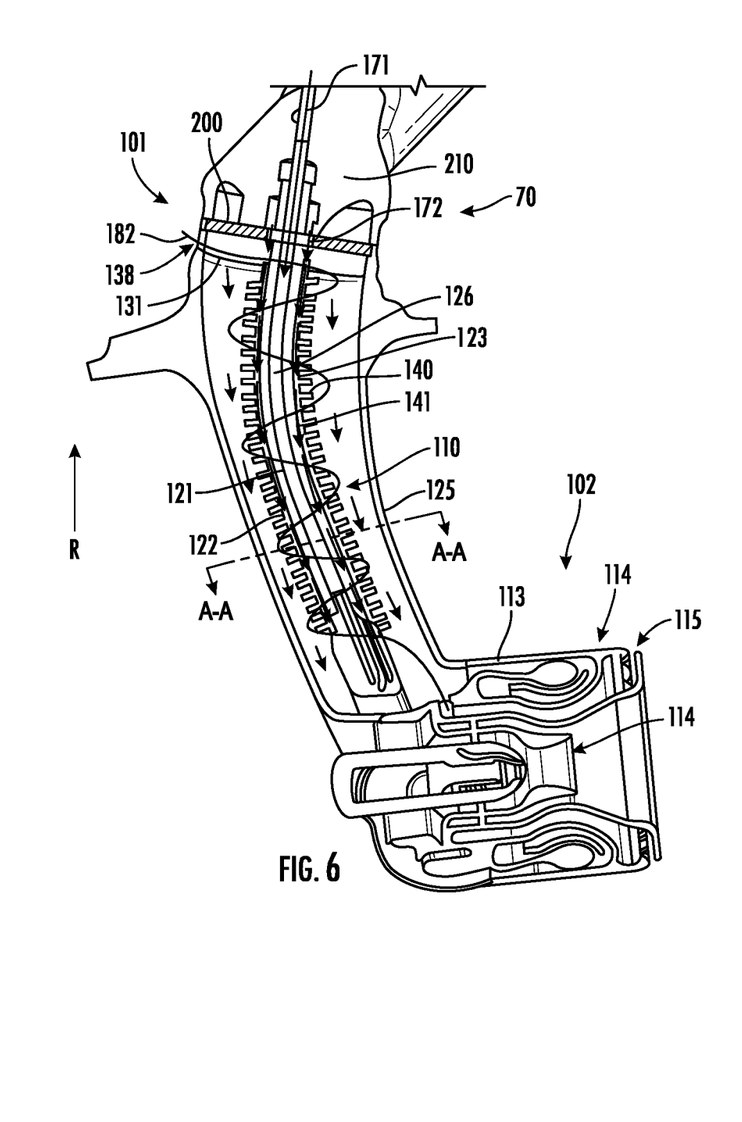
FIG. 6 is a cutaway cross sectional view of another exemplary embodiment of the fuel injector assembly of the combustion section of FIG. 2.
Figure 7:
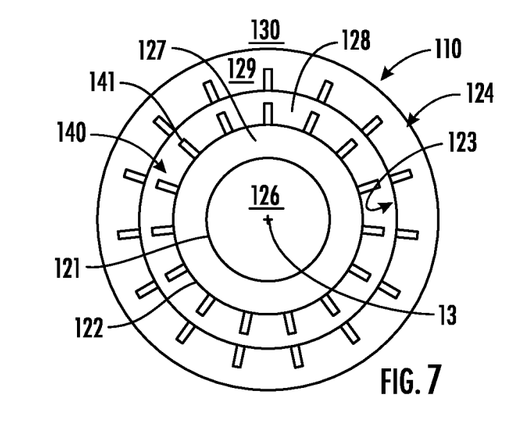
FIG. 7 is an exemplary embodiment of a cross sectional view of the fuel injector assembly of FIG. 6 at plane A-A.
Figure 8:
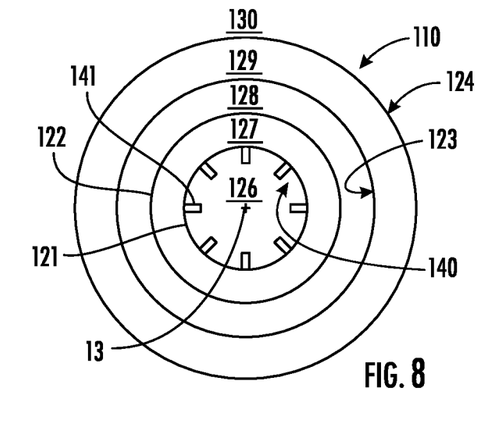
FIG. 8 is another exemplary embodiment of a cross sectional view of the fuel injector assembly of FIG. 6 at plane A-A.

Referring now to FIGS. 6-8, further exemplary embodiments of the fuel injector assembly 70 including the heat exchanger 160 are provided. FIG. 6 provides a cutaway cross sectional view of the fuel injector assembly. FIGS. 7-8 provide exemplary cross sectional views of the fuel injector assembly at plane A-A. The embodiments provided in regard to FIGS. 6-8 are configured substantially similarly as described in regard to FIGS. 3-5. In the embodiments provided in regard to FIGS. 6-8, the fuel injector assembly 70 further includes a fin structure 140 extended from one or more of the walls 121, 122, 123 extended within the body 110. The fin structure 140 includes a plurality of fins 141 disposed in circumferential arrangement relative to the reference centerline axis 13 extended through the body 110. In the embodiment depicted, the plurality of fins 141 is extended into fourth passage 129 from the inner wall 123 of the body 110. In other embodiments, the plurality of fins 141 is extended into one or more passages 126, 127, 128 defined between the walls 121, 122, 123, 124 of the body 110.

The fin structure 140 may promote and improve heat transfer from the working fluid 182 to one or more of the fuels 171, 172 flowing through the body 110. In one embodiment, such as depicted in regard to FIG. 7, the fin structure 140 is extended from the inner wall 123 into the fourth passage 129 such as to promote heat transfer from the working fluid 182 in the second passage 127 to the fuel in the third passage 128. In another embodiment, the fin structure 140 is extended from the second wall 122 into the second passage 127. In yet another embodiment, such as depicted in regard to the exemplary cross sectional view provided in FIG. 8, the fin structure 140 may be extended from the first wall 121 into the first passage 126.

Referring back to FIG. 6, in various embodiments, the plurality of fins 141 of the fin structure 140 may further be disposed in adjacent radial arrangement along the radial direction R. For example, the fin structure 140 may be disposed along a flowpath length of the passages 126, 127, 128 through the body 110 from the second end 102 to the first end 101. In one embodiment, the plurality of fines 141 is further arranged along the circumferential direction and the radial direction to provide a helical arrangement through one or more of the passages 126, 127, 128. The helical arrangement may provide a substantially helical flowpath of the working fluid 182 through the second passage 127. The helical flowpath may increase a residence time of one or more of the fluids 171, 172, 182 within the body 110 of the fuel injector assembly 70 such as to increase heat transfer between the fluids 171, 172, 182. The increased heat transfer may further cool the working fluid 182 to further provide one or more benefits described herein.

Figure 9:
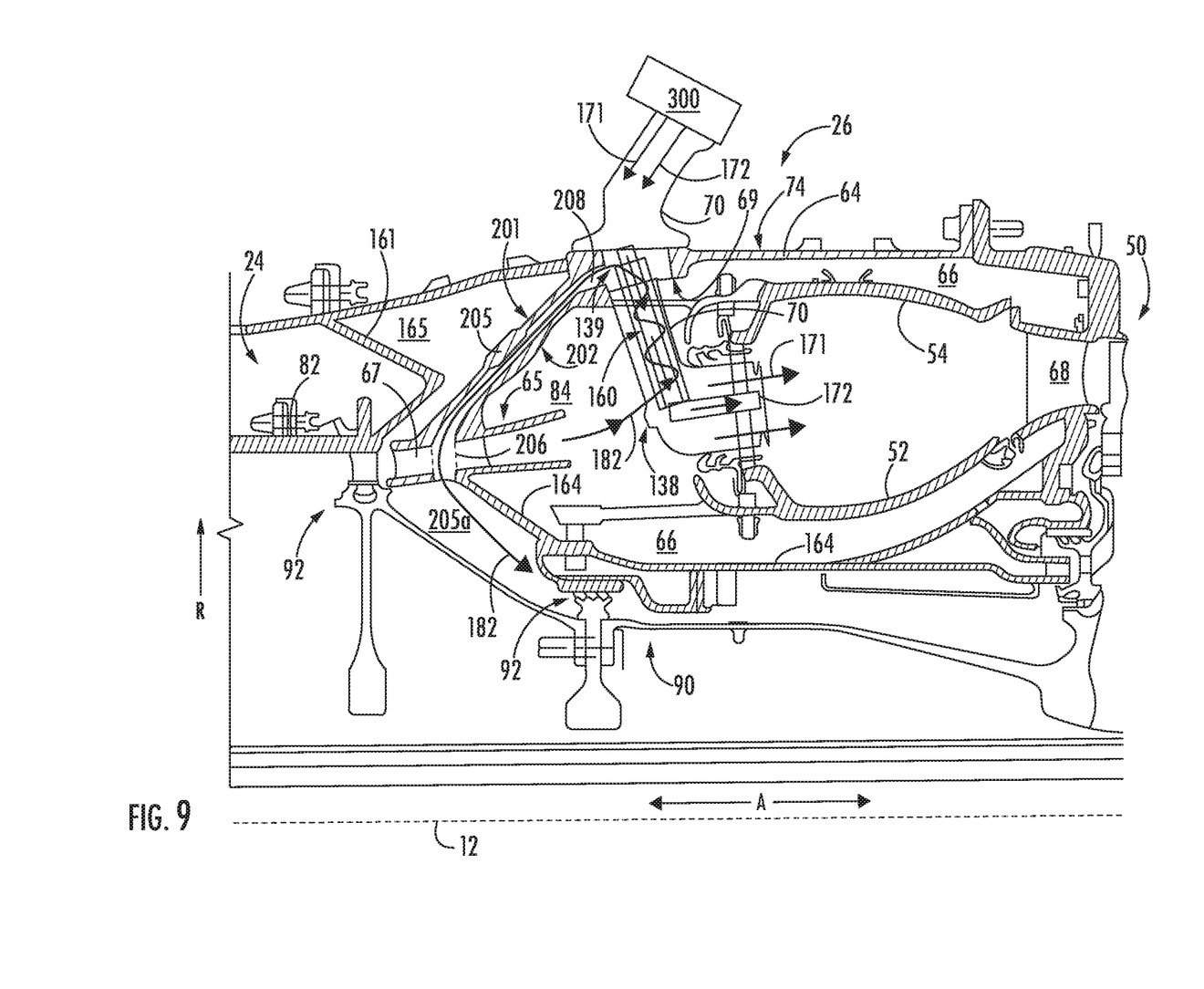
FIG. 9 is a cross sectional view of an exemplary combustion section of the heat engine of FIG. 1 according to an aspect of the present disclosure.

Referring now to FIG. 9, another exemplary embodiment of a portion of the engine 10 including the combustion section 26, a portion of the compressor 24, and a portion of the turbine 28 is provided. The embodiment provided in regard to FIG. 9 is configured substantially similarly as shown and described in regard to FIG. 2. As such, reference numerals or features illustrated or described as part of one or the other of the embodiments of FIG. 2 or 9 can be used with the other. It should further be appreciated that features or reference numerals in either of FIG. 2 or 9 may be omitted for clarity.

The engine 10 includes the combustion section 26 and the fuel injector assembly 70 together providing a heat exchanger flowpath including the first conduit 136 and the second passage 127 into the heat exchanger 160, in which the working fluid 182 is provided in thermal communication with one or more of the flows of fuel 171, 172 at the heat exchanger 160 to remove thermal energy from the working fluid 182. The heat exchanger flowpath further includes the second conduit 137 exiting through the second opening 139 to the flow passage 208 of the plenum 205, such as described above. In various embodiments, the helical flowpath of the working fluid 182 (e.g., the helical flowpath provided by the fin structure 140 at the heat exchanger 160) may further increase residence time at the heat exchanger 160 such as to promote heat exchange from the working fluid 182 to the one or more flows of fuel 171, 172 through the heat exchanger 160.

Figure 10:
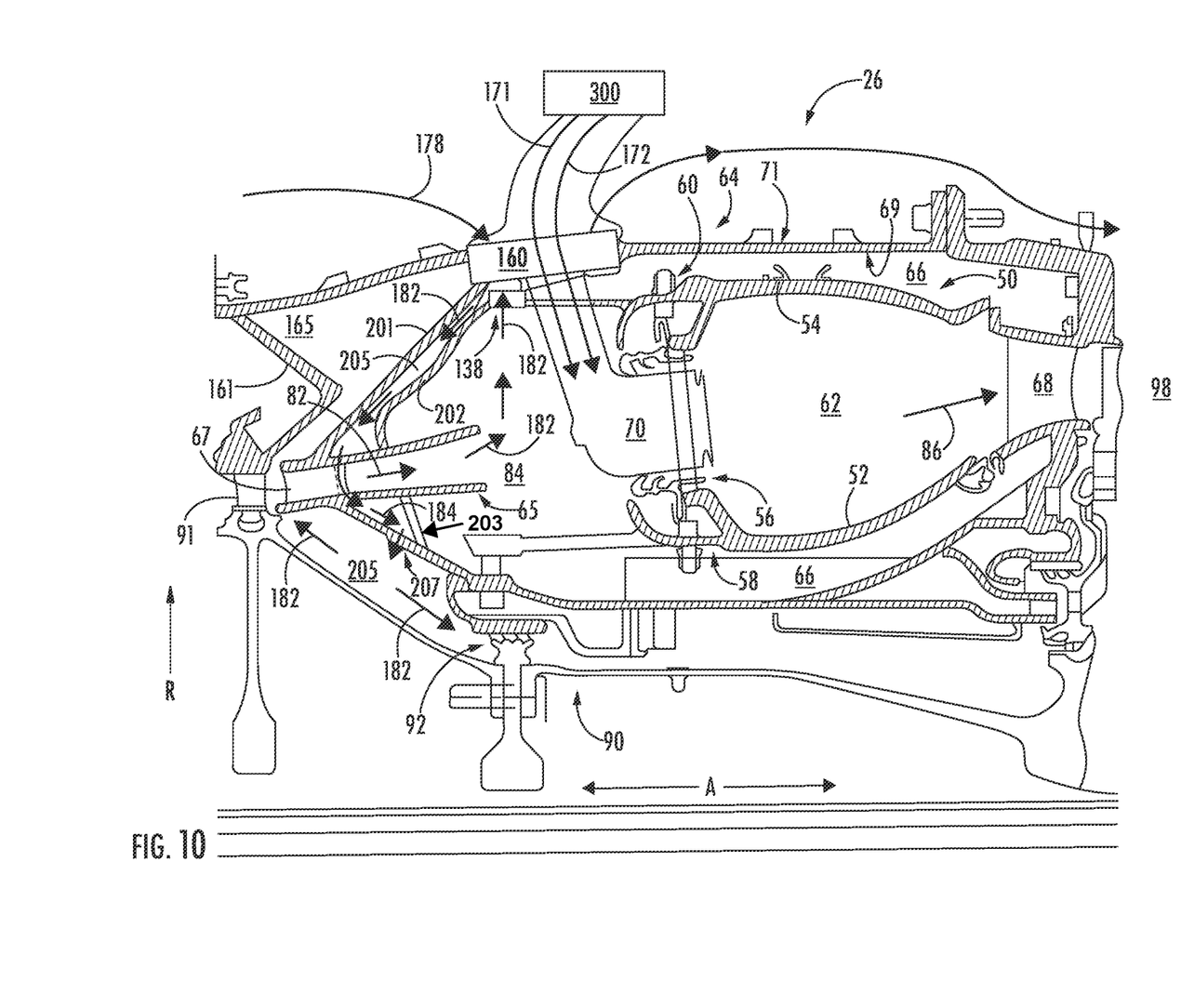
FIG. 10 is a cross sectional view of an exemplary combustion section of the heat engine of FIG. 1 according to another aspect of the present disclosure.

Referring now to FIG. 10, another exemplary embodiment of the engine 10 including the combustion section 26 and heat exchanger flowpath is provided. The embodiment provided in regard to FIG. 10 is configured substantially similarly as shown and described in regard to FIGS. 2-9. As such, reference numerals or features illustrated or described as part of one or another of the embodiments of FIG. 2, 9, or 10 can be used with the other. It should further be appreciated that features or reference numerals in either of FIG. 2, 9, or 10 may be omitted for clarity.

The combustion section 26 depicted in regard to FIG. 10 includes the heat exchanger 160 coupled to the fuel injector assembly 70 defined through the outer casing 64 in which the flow of working fluid 182 is provided from the diffuser cavity 84 to the heat exchanger via the first opening 138 to the second passage 127, such as further shown and described below in regard to FIGS. 11-12.

Figure 11:
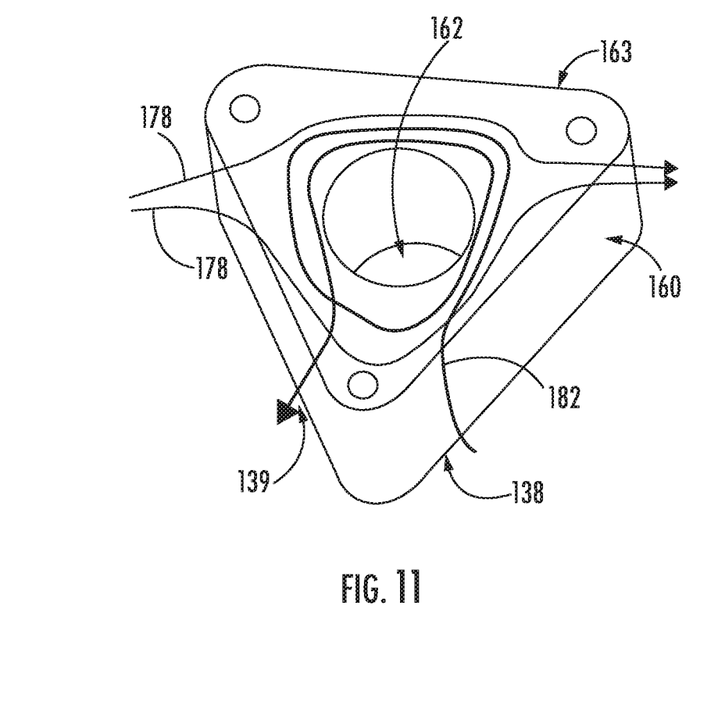
FIG. 11 is a perspective view of an exemplary portion of a heat exchanger according to an aspect of the present disclosure.

FIG. 11 provides an exemplary perspective view of another embodiment of the heat exchanger 160. FIG. 12 provides an exemplary cross sectional view of the embodiment of the heat exchanger 160 of FIG. 11 including the body 110 of the fuel injector assembly 70 disposed through an opening 162 in the heat exchanger 160. Regarding FIGS. 11-12, the heat exchanger 160 includes the first opening 138 defined through a heat exchanger body 163 surrounding the body 110 of the fuel injector assembly 70. The heat exchanger body 163 further includes the opening 162 to admit the body 110 of the fuel injector assembly 70 therethrough in thermal communication with the flow of working fluid 182 through the heat exchanger 160 and fluidly segregated from the flows of fuel 171, 172 via each body 110, 163.

The heat exchanger body 163 further includes a second cooling fluid inlet opening 166 and a second cooling fluid outlet opening 167 through which a flow of second cooling fluid 178 is admitted through the heat exchanger 160 in thermal communication with the working fluid 182. In various embodiments, the second cooling fluid 178 may define a portion of fan or compressor bypass air 78 such as described in regard to FIG. 1. In other embodiments (not depicted), the second cooling fluid 178 may include a third stream bypass air (e.g., bypass air from one or more compressors 22, 24). Generally, the second cooling fluid 178 may define a lower pressure and/or temperature relative to the compressed air 82 providing the working fluid 182 to the heat exchanger flowpath.

The heat exchanger 160 includes one or more walls therewithin to define the second passage 127 fluidly segregated from the flow of second cooling fluid 178 therethrough. In one embodiment, the second opening 139 is defined radially inward of the exterior surface 69 of the outer casing 64. In still another embodiment, the second cooling fluid inlet opening 166 is defined radially outward of the exterior surface 69 of the outer casing 64 such as to admit the flow of second cooling fluid 178 into the heat exchanger 160 from radially outward of the outer casing 64.

Figure 13:
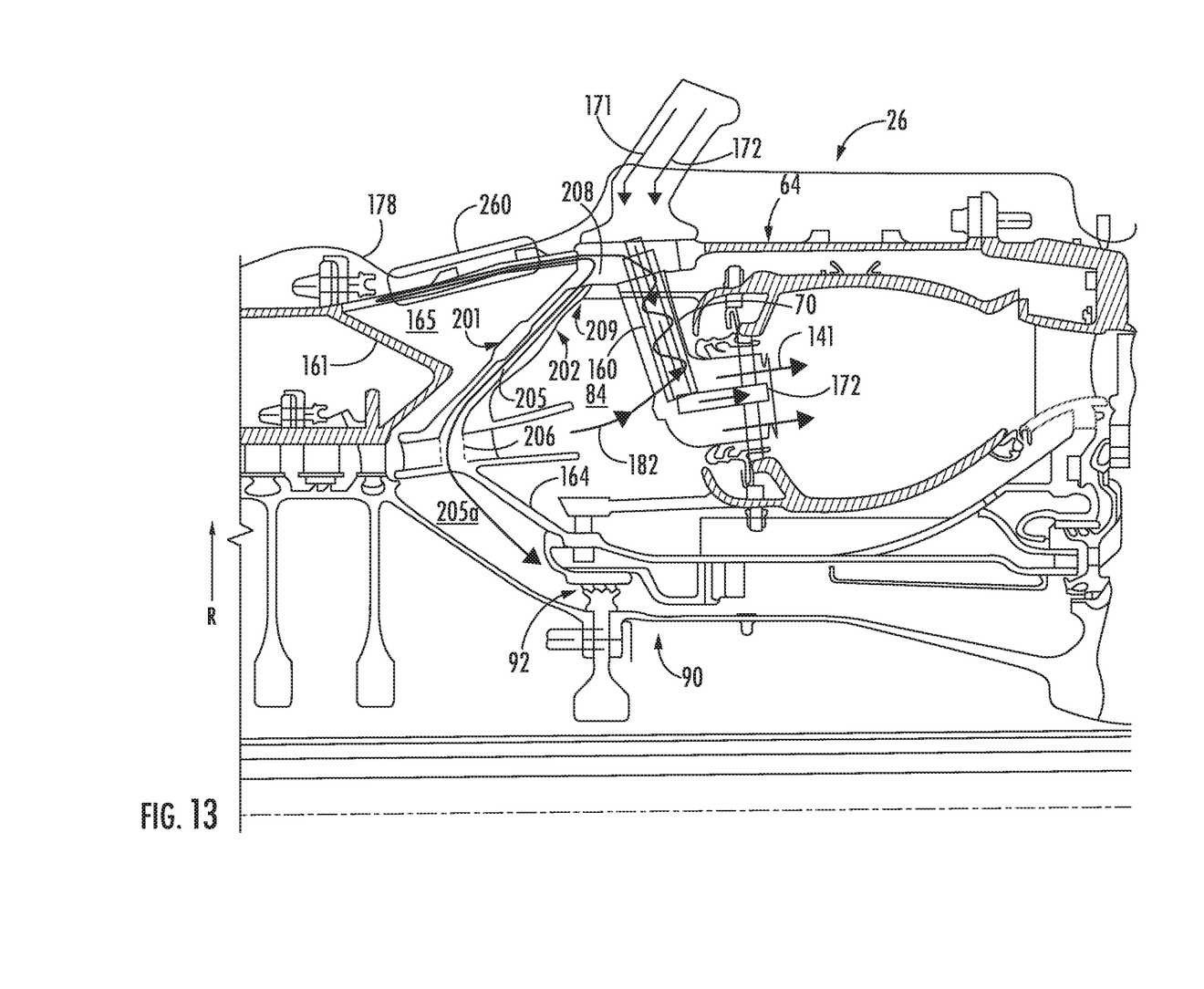
FIG. 13 is a cross sectional view of an exemplary combustion section of the heat engine of FIG. 1 according to an aspect of the present disclosure.

Referring now to FIG. 13, another exemplary embodiment of the engine 10 including the combustion section 26 and heat exchanger flowpath is provided. The embodiment provided in regard to FIG. 13 is configured substantially similarly as shown and described in regard to FIGS. 2-10. As such, reference numerals or features illustrated or described as part of one or another of the embodiments of FIG. 2, 9, 10, or 13 can be used with the other. It should further be appreciated that features or reference numerals in either of FIG. 2, 9, 10, or 13 may be omitted for clarity.

Figure 12:
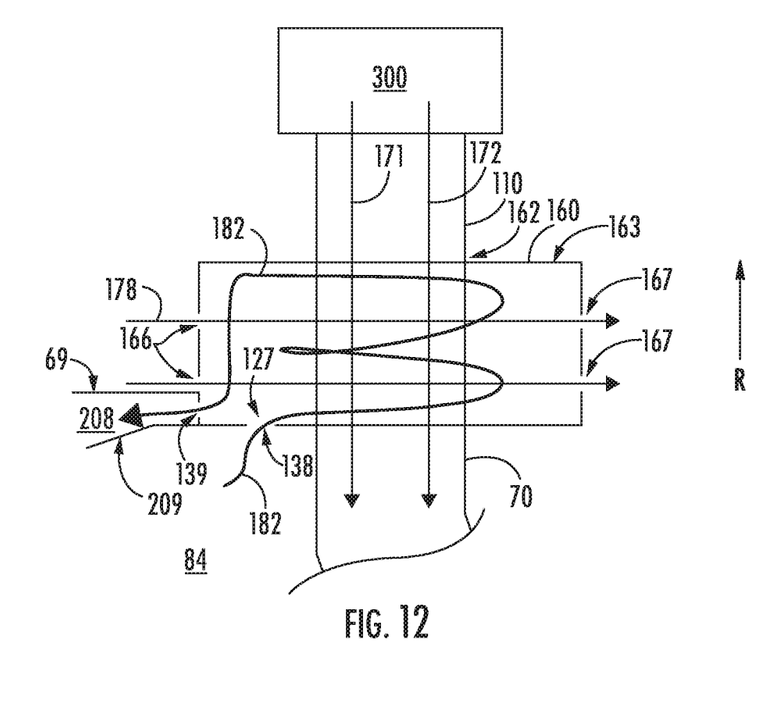
FIG. 12 is a schematic cross sectional view of an exemplary portion of the heat exchanger of FIG. 11.

FIG. 13 further provides a second heat exchanger 260 through the heat exchanger flowpath in which the second heat exchanger 260 is configured substantially similarly as shown and described in regard to the heat exchanger 160 in FIGS. 11-12. The heat exchanger flowpath extends from the fuel injector assembly 70 such as described in regard to FIGS. 2-9 and egresses the cooled working fluid 182 from the second passage 127 and the second conduit 137 through the second opening 139. The working fluid 182 egresses into the flow passage 208 and is provided into the second heat exchanger 260 in which the working fluid 182 is further cooled by the second cooling fluid 178 such as shown and described in regard to FIGS. 11-12. The working fluid 182, further cooled by the second cooling fluid 178, egresses the second heat exchanger 260 into the plenum 205 between the first plenum wall 201 and the second plenum wall 202. The working fluid 182 further flows through the crossover passage 206 into the cavity 205(*a*) between the rotor assembly 90 and the inner casing 164. The cooled working fluid 182 may be provided to one or more seals 92 at the rotor assembly 90, such as between the rotor assembly 90 and the inner casing 164. In various embodiments, the cooled working fluid 182 may flow further downstream to cool portions of the turbine 28.

Additionally, or alternatively, the fuel injector assembly 70 may further include additional walls to define additional fluid flow passages therebetween. For example, the first passage 126 may provide a pilot fuel source, such as for promoting ignition or low- or mid-power conditions, such as idle, cruise, or other part-load conditions, or for promoting or advantageously affecting heat release characteristics at the combustion chamber 62 (e.g., pressure oscillations, acoustics, etc.). The third passage 128 may provide a main fuel source such as to provide high-power conditions at the combustion chamber 62, such as take-off or full load conditions. The plurality of walls 120 may further include a third wall or more to provide an additional pilot fuel source, thereby providing a primary and secondary pilot circuit. Embodiments of the fuel injector assembly 70 provided herein may generally provide the second passage 127 surrounded by the first and third passages 126, 128 and in thermal communication therewith. The working fluid 182, such as a portion of compressed air 82 from the compressors 22, 24, is conditioned as a cooling fluid to the head 113 of the fuel injector assembly 70, or more particularly more thermally distressed downstream portions thereof inward into the combustion chamber 62.

The fuel injector assembly 70, the combustion section 26, and the combustor assembly 50 depicted in regard to FIGS. 1-13 and described herein may be constructed as an assembly of various components that are mechanically joined or arranged such as to produce the fuel injector assembly 70 shown and described herein. The fuel injector assembly 70, or portions thereof, may alternatively be constructed as a single, unitary component and manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or mechanical fasteners, or any combination thereof, may be utilized to construct the fuel injector assembly 70 or the combustion section 26. Furthermore, the fuel injector assembly 70 may be constructed of any suitable material for turbine engine combustor sections, including but not limited to, nickel- and cobalt-based alloys. Still further, flowpath surfaces and passages may include surface finishing or other manufacturing methods to beneficially affect drag or otherwise promote heat transfer or advantageously affect fluid flow. Such manufacturing methods or surface finishing may include methods to promote fluid flow, such as, but not limited to, tumble finishing, barreling, rifling, polishing, or coating. Other methods may include those to promote heat transfer or increase residence time of one or more fluids within the fuel injector assembly 70, such as, but not limited to, protuberances, promoting roughness, or other surface features to affect fluid flow rate or heat transfer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbo machine, the turbo machine comprising:
an outer casing extended along an axial direction;
a prediffuser defining an inlet passage into a combustion section of the turbo machine;

an inner casing extended from the prediffuser, wherein a diffuser cavity is defined between the outer casing and the inner casing;
a first plenum wall extended outward along a radial direction from the prediffuser;
a second plenum wall extended outward along the radial direction from the prediffuser, wherein the second plenum wall is separated along the axial direction from the first plenum wall, and wherein a plenum is defined between the first plenum wall and the second plenum wall;
a fuel injector assembly downstream of the prediffuser, and comprising a body defining an outer surface and an inner surface; and
a heat exchanger at least partially disposed within the body, wherein the heat exchanger comprises a plurality of passages fluidly segregated from one another by a plurality of walls in concentric arrangement, the heat exchanger comprising a first conduit in fluid communication with the diffuser cavity, and wherein the first conduit is in fluid communication with at least one of the plurality of passages, and a second conduit in fluid communication with the at least one of the plurality of passages and the plenum, and further wherein a flow of working fluid is admitted from the diffuser cavity through the heat exchanger to the plenum via the first conduit, the at least one of the plurality of passages and the second conduit.

2. The turbo machine of claim 1, wherein the first plenum wall and the second plenum wall are each extended along a circumferential direction to define the plenum annularly.

3. The turbo machine of claim 1, wherein the prediffuser comprises a vane through which a crossover passage is defined in fluid communication with the plenum and a cavity radially inward of the inner casing.

4. The turbo machine of claim 3, further comprising:
a rotor assembly extended radially inward of the inner casing, wherein the rotor assembly comprises a seal, and wherein the cavity is defined between the rotor assembly and the inner casing in fluid communication with the plenum and the seal.

5. The turbo machine of claim 1,
wherein the plurality of passages comprises a first passage surrounded by a second passage, and further wherein the plurality of walls defines a third passage surrounding the second passage; and
wherein the first conduit is defined by a first conduit wall defined through the body from the outer surface, and wherein the first conduit wall fluidly segregates the first conduit from the third passage, and further wherein the first conduit is configured to admit the flow of working fluid from the diffuser cavity into the second passage.

6. The turbo machine of claim 5, wherein the heat exchanger further comprises:
a second conduit wall defined through the body from the outer surface, wherein the second conduit wall defines the second conduit in fluid communication with the second passage, and wherein the second conduit wall fluidly segregates the first conduit from the third passage, wherein the second conduit is configured to egress the flow of working fluid from the second passage to the plenum.

7. The turbo machine of claim 5, wherein the fuel injector assembly comprises a fin structure extended from one or more of the plurality of walls into the second passage, wherein the fin structure defines a helical flowpath through the second passage.

8. The turbo machine of claim 5, further comprising:
a fuel system configured to provide one or more flows of de-oxygenated fuel to the first passage and the third passage of the fuel injector assembly, and wherein the second passage is configured to receive a flow of compressed air from the diffuser cavity via the first conduit, and wherein the fuel injector assembly is configured to egress the flow of compressed air via the second conduit, and wherein the one or more flows of fuel and the compressed air are in thermal communication within the heat exchanger.

9. The turbo machine of claim 1, wherein the second plenum wall comprises an axially extended portion coupled to the heat exchanger, wherein the second plenum wall fluidly segregates the plenum from the diffuser cavity.

10. The turbo machine of claim 9, wherein a flow passage of the plenum is defined between the outer casing and the axially extended portion of the second plenum wall, and wherein an opening at the second conduit of the heat exchanger is defined in direct fluid communication with the flow passage.

11. The turbo machine of claim 1, wherein the heat exchanger comprises a heat exchanger body through which the first conduit, the passage, and the second conduit are defined.

12. The turbo machine of claim 11, wherein the heat exchanger further defines an opening through which the fuel injector assembly is disposed, and wherein one or more flows of fuel are provided in thermal communication with the flow of working fluid through the heat exchanger.

13. The turbo machine of claim 11, wherein the heat exchanger further defines a fluid inlet opening through the heat exchanger body, wherein a flow of fluid is admitted through the heat exchanger in thermal communication with the working fluid.

14. The turbo machine of claim 1, wherein the heat exchanger is disposed at least partially through the outer casing, and wherein the second conduit is in fluid communication with the diffuser cavity.

15. The turbo machine of claim 1, further comprising:
a pressure plenum wall disposed forward of the first plenum wall along the axial direction, wherein a pressure plenum is defined between the first plenum wall and the pressure plenum wall.

16. The turbo machine of claim 1, further comprising:
a third plenum wall extended from the prediffuser along the radial direction, wherein the third plenum wall is spaced apart along the axial direction from a portion of the inner casing extended from the prediffuser.

17. The turbo machine of claim 16, wherein a plenum opening is defined through the portion of the inner casing such as to provide fluid communication to a cavity between a rotor assembly and the inner casing.

18. The turbo machine of claim 1, wherein the heat exchanger including the first conduit, the passage, and the second conduit egressed to the plenum defined at least in part by the first plenum wall and the second plenum wall together define a heat exchanger flowpath.

19. The turbo machine of claim 1, further comprising:
a second heat exchanger disposed at least partially through the outer casing, wherein the second heat exchanger is configured to receive the flow of working fluid from the second conduit of the heat exchanger, and wherein the second heat exchanger is in fluid communication with the plenum.

* * * * *